(No Model.)　　　　　　　　　　　　　　　　　　　5 Sheets—Sheet 1.
C. ALKINS.
MACHINE FOR MAKING ARCH BARS.

No. 312,244.　　　　　　　　　　　Patented Feb. 17, 1885.

Witnesses.

Inventor.
Charles Alkins,
per. Gridley & Co.
his Attorneys.

(No Model.) 5 Sheets—Sheet 2.
C. ALKINS.
MACHINE FOR MAKING ARCH BARS.
No. 312,244. Patented Feb. 17, 1885.
Fig. 4.
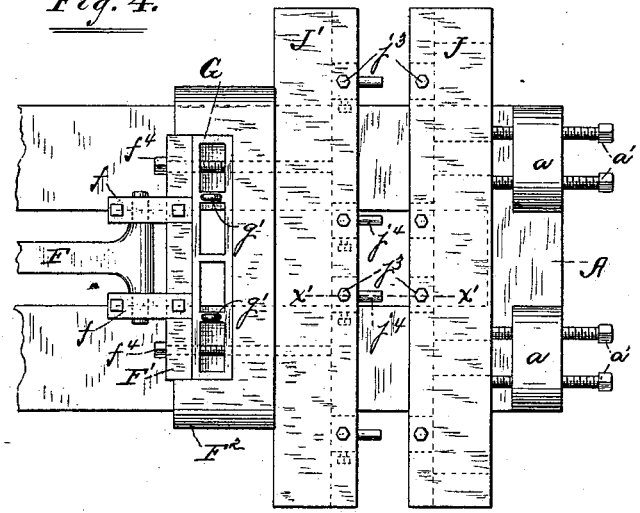
Fig. 5.
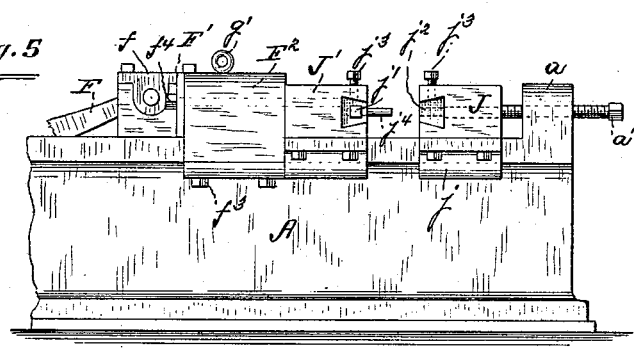
Fig. 6.
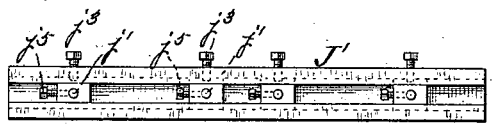
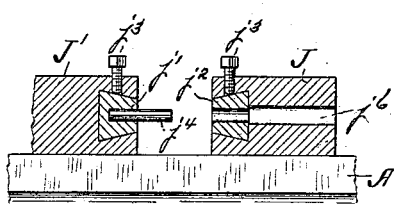
Fig. 7.
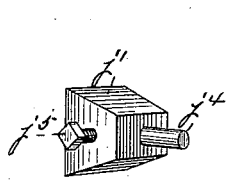
Fig. 8.
Fig. 9.
Witnesses.
Inventor.
Charles Alkins
per Gridley & Co
his Attorneys.

(No Model.)  5 Sheets—Sheet 3.

C. ALKINS.
MACHINE FOR MAKING ARCH BARS.

No. 312,244.  Patented Feb. 17, 1885.

Witnesses.  Inventor.
Charles Alkins.
per Gridley & Co.
his Attorneys.

(No Model.) 5 Sheets—Sheet 4.

C. ALKINS.
MACHINE FOR MAKING ARCH BARS.

No. 312,244. Patented Feb. 17, 1885.

Witnesses.
Henry Frankfurter
D. H. Fletcher

Inventor.
Charles Alkins,
per Gridley & Co.
his Attorneys.

(No Model.) 5 Sheets—Sheet 5.

C. ALKINS.
MACHINE FOR MAKING ARCH BARS.

No. 312,244. Patented Feb. 17, 1885.

Witnesses.

Inventor.
Charles Alkins.
per Gridley & Co
his Attorneys.

UNITED STATES PATENT OFFICE.

CHARLES ALKINS, OF CHICAGO, ILLINOIS, ASSIGNOR TO THE AJAX FORGE COMPANY, OF SAME PLACE.

MACHINE FOR MAKING ARCH-BARS.

SPECIFICATION forming part of Letters Patent No. 312,244, dated February 17, 1885.

Application filed May 3, 1884. (No model.)

*To all whom it may concern:*

Be it known that I, CHARLES ALKINS, of Chicago, in the county of Cook and State of Illinois, have invented a new and useful Improvement in Machines for Straightening, Shearing, Punching, and Bending Arch-Bars, of which the following is a description, reference being had to the accompanying drawings, in which—

Figure 1:
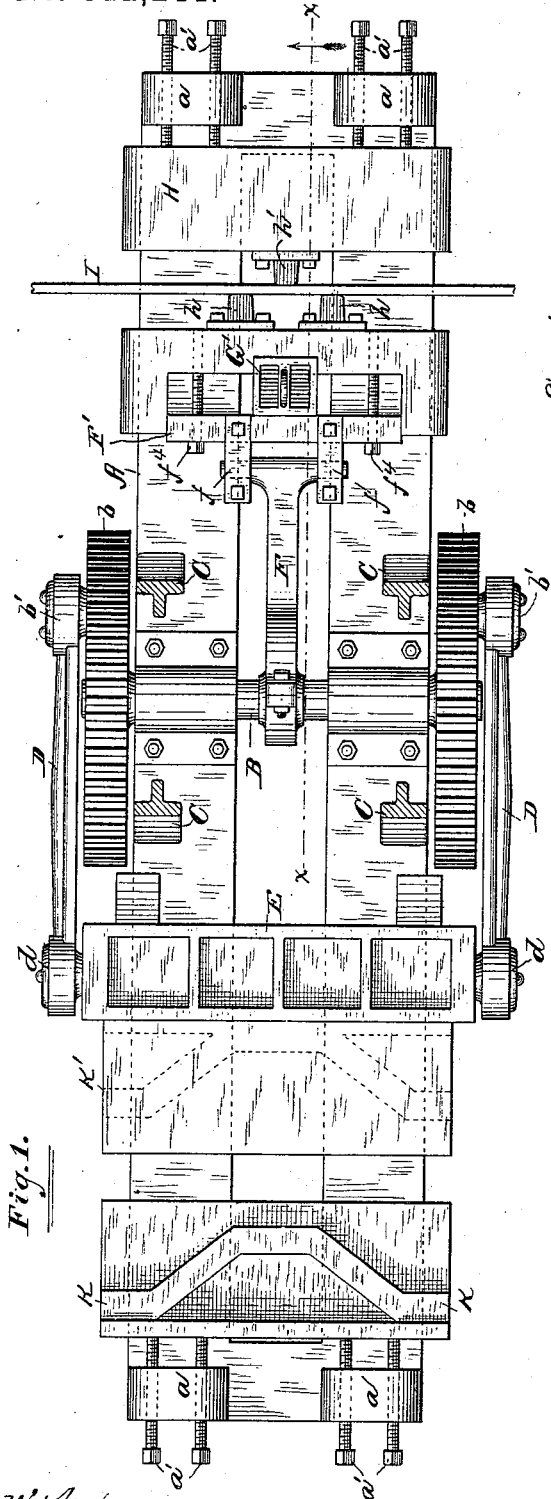
Figure 2:
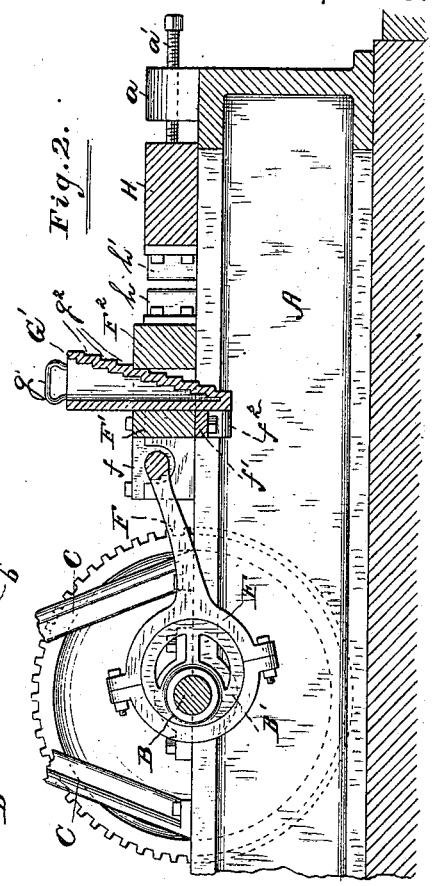
Figure 3:
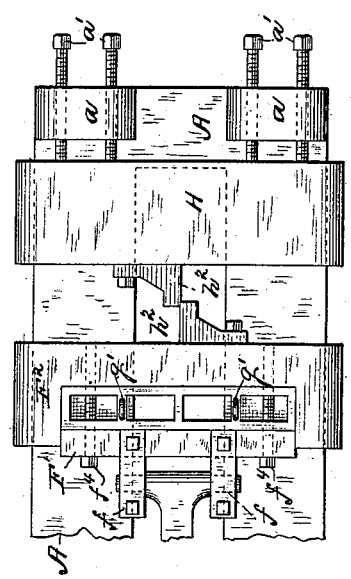
Figure 10:
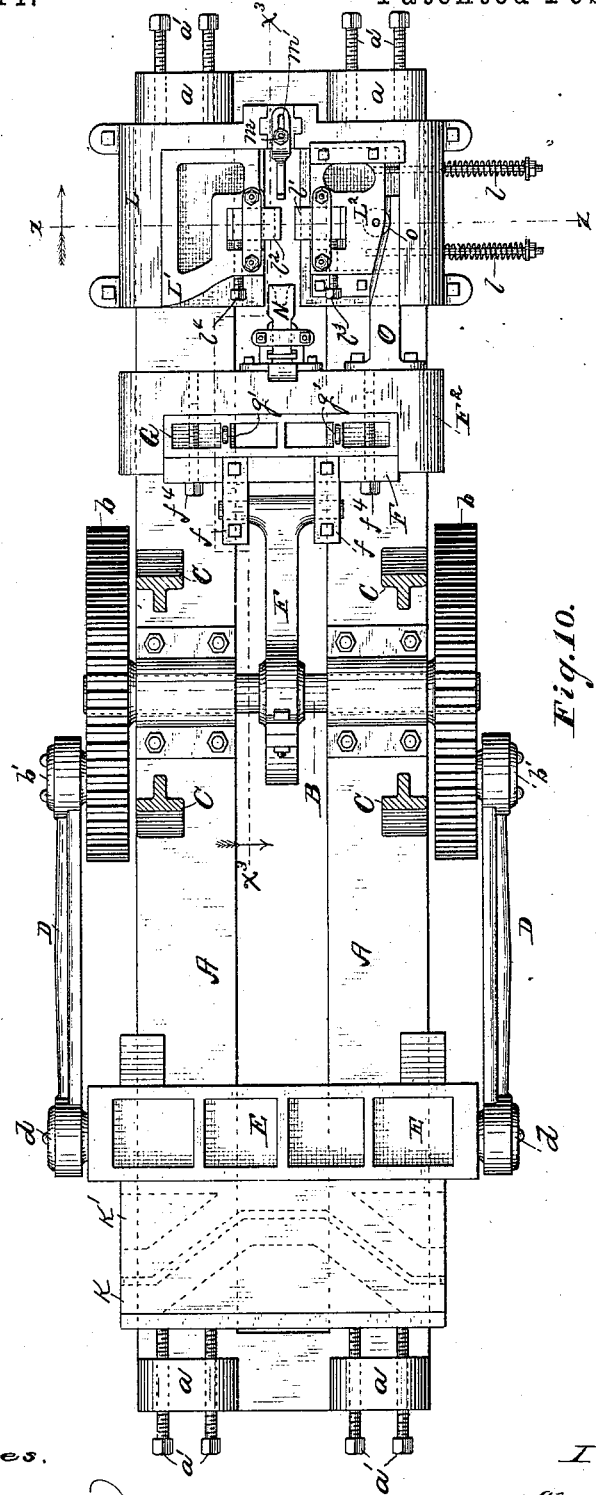
Figure 12:
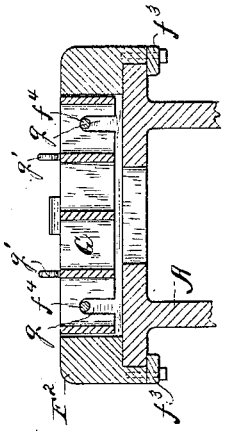
Figure 11:
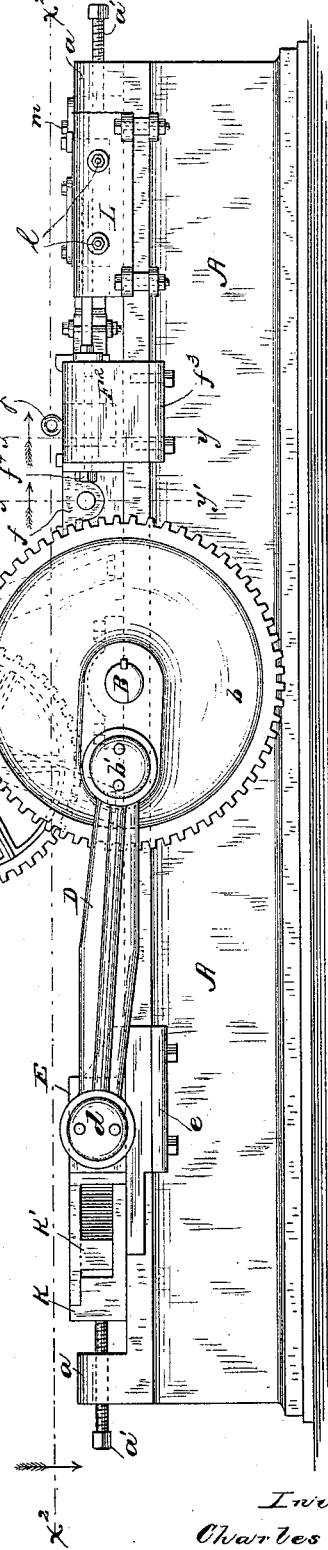
Figure 13:
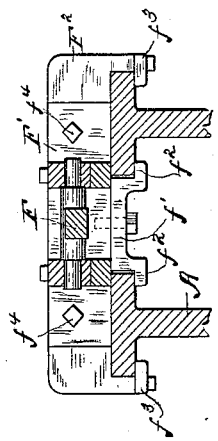
Figure 14:
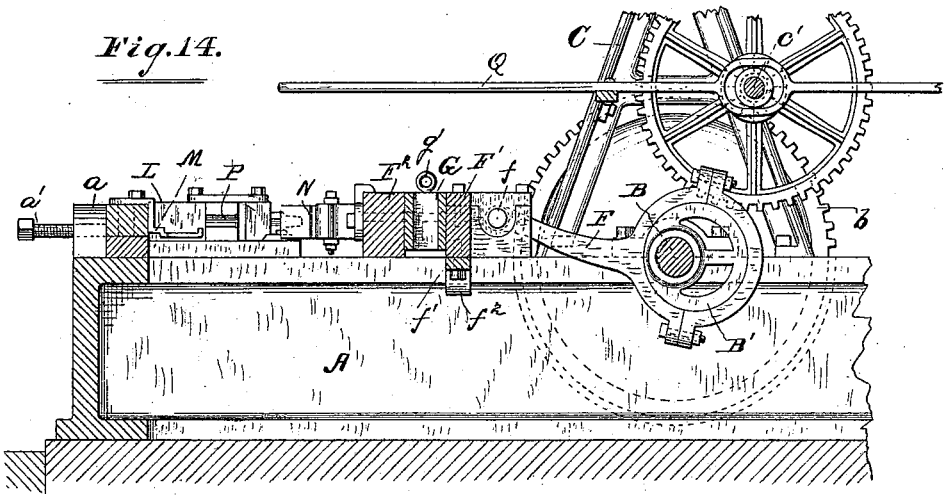
Figures 15, 17:
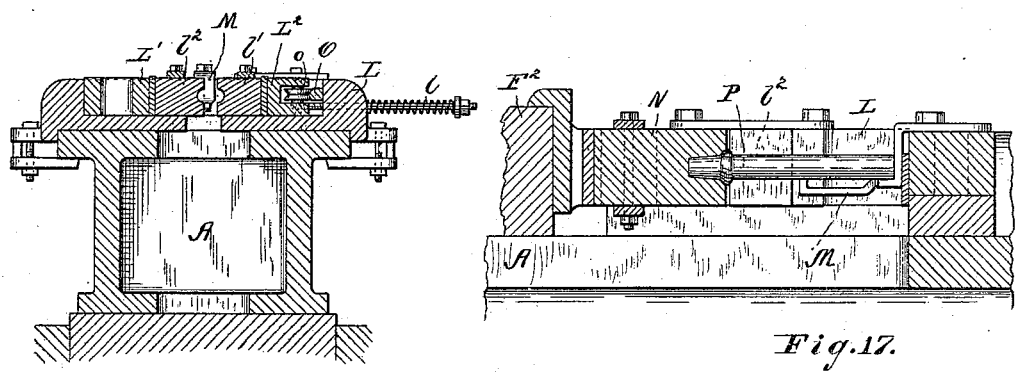
Figure 16:
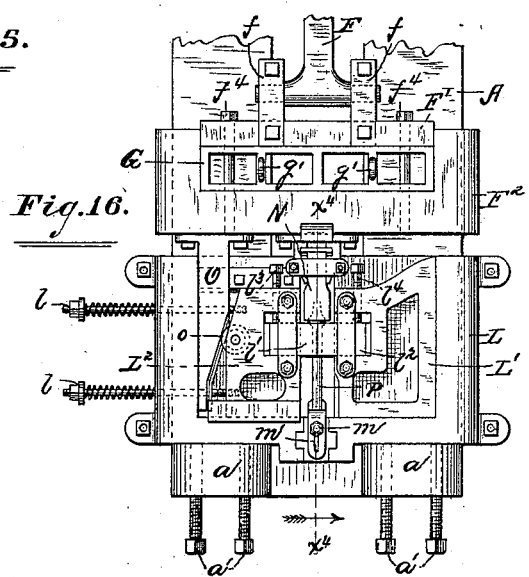

Figure 1 is a plan view of said machine as applied to the purposes of straightening and bending, a part of the driving-gears being removed in order to show more completely said working mechanism. Fig. 2 is a vertical sectional view of a part of said machine on the line $x\ x$, Fig. 1, as viewed in the direction of the arrow there shown. Fig. 3 is a detail view in plan of one end of said machine as adapted to the purpose of shearing. Fig. 4 is a like view of said end, showing dies inserted for the purpose of punching said bars. Fig. 5 is a side view of the same. Fig. 6 is a face view of the male dies. Fig. 7 is a transverse vertical sectional view of said dies on the line $x'\ x'$. (Shown in Fig. 4.) Fig. 8 is a perspective view in detail of the male punching-die. Fig. 9 is a like view of the corresponding female die. Fig. 10 is a plan view of the bed and principal mechanism of said machine, a part of the same being in section upon the line $x^2\ x^2$, Fig. 11, as viewed in the direction of the arrow there shown, and showing said machine provided with dies for upsetting coupling-pins. Fig. 11 is a side view of said machine as provided with the dies last named, showing the driving-gears. Fig. 12 is a transverse vertical sectional view of that portion of the machine taken on the line $y\ y$, Fig. 11, as viewed in the direction of the arrow there shown. Fig. 13 is a like view taken on the line $y'\ y'$ in said Fig. 11, viewed in the direction indicated by the arrow there shown. Fig. 14 is a longitudinal vertical sectional view of that portion of the machine indicated by the line $x^3\ x^3$, Fig. 10, as viewed in the direction of the arrow there shown. Fig. 15 is a transverse vertical sectional view taken upon the line $z\ z$, Fig. 10, as viewed in the direction of the arrow. Fig. 16 is a plan view in detail of a portion of said machine as portrayed in Fig. 10, showing the respective parts in extreme opposite positions from those indicated in said figure; and Fig. 17 is a central vertical sectional view of that portion of said machine indicated by the line $x^4\ x^4$, Fig. 16, as viewed in the direction shown by the arrow in said figure.

Like letters of reference indicate like parts in the different figures.

My invention relates to that class of forging-machines used in the manufacture of arch-bars for railway-car trucks; and it is especially designed to obviate the necessity for performing the various portions of said work upon different machines by producing a single combined machine which may be compact in form, simple in construction and operation, and upon which the various parts of said work, as well as other work analogous thereto, may be performed in its natural order, thus saving expense in shop-room, in the expenditure of power, and in the extra handling of said material incident to the use of different machines.

My invention likewise has reference to a novel means for changing or modifying the length of stroke or movement of the blocks or cross-heads to which the dies or shears or other tools are secured to meet the varying requirements of the work performed thereon, all of which will be hereinafter more fully described, and definitely pointed out in the claims.

In the drawings, A represents the bed or frame of the machine, which is constructed of cast-iron in the manner common to machines of it class, and consists of two I-castings, a cross-section of which is shown in Fig. 15, extending the entire length of the machine, and joined at the ends by somewhat similar castings made solid therewith and forming a part thereof. Secured in suitable bearings at or near the middle of said bed is a shaft, B, upon the outer ends of which are the main driving gear-wheels $b\ b$. Rigidly secured to said bed above said shaft is a frame, C, forming bearing-supports for driving-shafts $c\ c'$, Fig. 11, upon which, respectively, are placed a pulley and suitable gearing for obtaining the requisite power to drive said wheels $b\ b$. Upon the outside of the wheels $b\ b$ are crank-pins $b'\ b'$, which operate pitmen D D, the latter in turn being connected by means of crank-pins $d\ d$ with a cross-head, E, adapted to reciprocate upon the bed A, to which the same is loosely secured by flanges $e$, one of which is shown in Fig. 11 bolted to the bottom thereof. Upon the opposite ends of the bed A, respectively, are rigid upward projections $a\ a\ a\ a$, to which may be secured the various stationary dies, as hereinafter more fully described, which may be adjusted at will as required by means of the set-screws $a'$, passing through said projections or abutments and connecting with said respective dies or their supports.

Upon the center of the shaft B, I place an eccentric, B′, Figs. 2 and 14, with which is connected, in the usual manner, a pitman, F, the opposite end of which is constructed in a T-shape, and loosely fitted in bearings $f\ f$, which are rigidly secured to and form a part, F′, of an adjustable cross-head consisting of two main parts, F′ F², which is adapted to move back and forth upon ways formed by the bed A in like manner to the cross-head E, the said part F′ being secured in position by a detachable part, $f'$, better shown in Figs. 2 and 13, said part being bolted, as shown, to the cross-head F′, and provided with flanges $f^2 f^2$, Fig. 13, which project beneath the inner flanges of the bed A. It will be seen that the part F′ is shorter than the width of the bed A, while F² is somewhat longer, the same projecting sufficiently over the sides of the bed to permit flanges $f^3 f^3$ to be bolted thereon so as to project beneath the outer flanges of said bed. The part F² is provided with a recess, into which the part F′ is loosely adjusted, the two being attached to each other by means of the bolts $f^4 f^4$, which are firmly secured to the part F², but pass loosely through holes in F′, so that the latter may move back and forth a considerable distance without actuating the part F², said movement of the part F² being normally limited in its backward travel by the heads of the bolts $f^4 f^4$, and in its forward travel by actual contact with the part F′, unless a block or wedge be interposed, as hereinafter shown. Thus it will be seen that the length of movement of the part F², to which the dies are secured, as hereinafter shown, is capable of being varied, as is frequently necessary, for different purposes. Should the full movement be required, a detachable block, G, may be inserted in the recess between the parts F′ and F², said block being preferably provided with notches $g\ g$, Fig. 12, by which it is sustained upon the bolts $f^4 f^4$, and with handles $g'\ g'$, by which the same may be lifted out when desired. Should the length of said movement require frequent variation during the time the machine is in use, the same may be accomplished by means of a wedge-shaped block, G′, Figs. 1 and 2, said wedge being provided with notches $g^2 g^2$, Fig. 2, and a handle, $g'$, whereby the same may be raised or lowered at will to produce longer or shorter strokes of the cross-head F². This is particularly desirable in straightening bars of varying crookedness, as hereinafter described.

Within the projections $a\ a$, Figs. 1, 2, and 3, upon the end on which said cross-head F² is placed, is a removable block, H, loosely secured to the bed A by means of suitable flanges, as in the case of said cross-heads E and F², which block is capable of a limited movement for the purposes of adjustment by means of the set-screws $a'\ a'$. Projecting blocks $h\ h$, bolted upon the cross-head F², and a like single projection midway between them upon the block H, serve as a means for straightening bars, as shown in said figure, in which I represents the bar to be acted upon, and the movement of the cross-head F² being regulated as above described by the operator, who raises or lowers the wedge G′ to the proper notch to obtain the requisite result. In case it is desired to use said end of the machine in shearing, the same may be accomplished by removing the blocks $h\ h\ h'$ and replacing them with shears $h^2 h^2$, Fig. 3, which are bolted thereto in the usual manner. The bars, when sheared to the proper length for arch-bars, may then be punched as follows: The block H being removed, the same is replaced by a longer block, J, Figs. 4 and 5, which is adjustably secured upon the bed by means of flanges, one of which is shown at $j$, Fig. 5, and said set-screws $a'$. A similar block, J′, of corresponding length is then bolted to the face of the cross-head F². Said blocks J J′ are grooved or dovetailed their entire length upon their respective faces in the manner more clearly shown in Figs. 5 and 6, said grooves being adapted, respectively, to receive a series of dovetailed blocks, $j'\ j^2$, which are shown in perspective in Figs. 8 and 9. Said respective series of blocks may be, when properly adjusted, retained in position by means of set-screws $j^3$. The blocks $j'$ are adapted to receive punches or male dies $j^4$, which are retained in place by set-screws $j^5$, while the blocks $j^2$ are pierced, as shown, to form counterparts thereto, or female dies, openings, or slots $j^6$, Fig. 7, being formed in the block J, through which the waste metal may pass and be disposed of when punched out. As the head F² requires but one adjustment when used for this purpose, the block G may be inserted in the recess between the parts F′ F², as shown in Fig. 4.

Upon the opposite end of the machine is secured and made adjustable in a similar manner to the blocks H and J, by means of the set-screws $a'\ a'$, a male die, K, Fig. 1, a counterpart of which, K′, is likewise attached to the cross-head E. Said dies are adapted to bend the bars heretofore described as being straightened, sheared, and punched upon the opposite end of the machine into the form of arch-bars for railway-car trucks.

It will be seen by reference to Fig. 1 that the eccentric B′ is so adjusted upon the shaft as to produce a forward stroke of the cross-head actuated by the pitman F, while the cross-head E is moving back, and vice versa, thus utilizing the full power of the machine on each stroke in doing consecutive work, which heretofore it has been found necessary to do upon separate machines. As fast as the bars are sheared and punched at one end they may be transferred to the other and there finished.

A further advantageous feature of said machine is that by changing the dies upon the respective ends thereof other work analogous to that above named may be performed, as the "upsetting" of coupling-pins, bolt-heads, and the like, as well as the bending of links. Said upsetting mechanism is as follows: Upon the end of the machine, upon which is adjusted the block H, above described, I secure in like manner, by means of flanges and the set-screws $a'\ a'$, a block, L, Figs. 10, 11, and 14 to 17, inclusive. Upon said main block L are secured supplemental blocks or parts $L'\ L^2$, the former of which is stationary as to its relation with said block L, while the latter is capable of a limited lateral movement in suitable ways, as clearly shown in Fig. 16, said block $L^2$ being held in its normal position by means of sliding bolts and springs $l\ l$. Clamping-dies of such length as to meet at the center, as in Fig. 16, when the block $L^2$ is moved from its normal position, (shown in Fig. 10,) are held in place by means of set-screws $l^3\ l^4$, the faces of said dies being concave in form, and somewhat smaller than the bar to be received between them, so as to clamp the same rigidly when they are brought together. A rest or gage, M, is secured to the block L midway between the blocks $L'\ L^2$ by means of the bolt $m$, said rest being provided with a slot, $m'$, whereby it may be adjusted to the varying lengths of bolts or pins. A die or former, N, having a mold of any desired shape, is bolted to the cross-head $F^2$, as shown, while a wedge, O, Figs. 10, 15, and 16, is likewise bolted to said cross-head, a part of the block $L^2$ being beveled to receive the point thereof, as shown. A friction-roller, $o$, upon said block enables said wedge to force said block laterally upon its ways with greater ease and less wear. The pin or bar, after being heated, is placed and held upon the rest M, when the cross-head $F^2$ is withdrawn, and the parts are open, as shown in Fig. 10. The reverse movement of said cross-head, by means of the wedge O, forces the clamping-die $l'$ against the bar or pin P, which rests against the corresponding die, $l^2$, thus holding the pin firmly in place while the same is upset or headed by means of the former N, the springs $l\ l$ causing the block $L^2$ to be drawn back as soon as the wedge O is withdrawn.

It is obvious that pins or bolts of any size may be headed or upset by merely changing the clamping-dies $l'\ l^2$, the former N, and the relative position of the rest M.

The driving mechanism of said machine may be thrown into and out of gear by means of the lever-bar Q, Figs. 11 and 14.

Having thus described my invention, what I claim, and desire to secure by Letters Patent, is—

1. In a machine of the class described, the combination of a suitable bed having a driving-shaft placed at or near a point midway between its extremities, provided with crank-wheels, and an eccentric with pitmen extending in opposite directions therefrom, and connecting with cross-heads having suitable blocks and shears, with stationary counterparts upon the respective ends of the bed, and means for operating said shaft, substantially as and for the purposes specified.

2. In a machine as above described, the combination of a bed with a horizontal driving-shaft between its extremities, said shaft having crank-wheels, and an eccentric with pitmen extending in opposite directions therefrom, and connecting with cross-heads having shears and bending-dies upon the respective ends of said machine, with suitable counterparts thereto, substantially as described, and for the purposes set forth.

3. In a machine as described, the combination of a bed having a driving-shaft located midway between its extremities, said shaft being provided with crank-wheels, and an eccentric with pitmen attached thereto, respectively, and extending in opposite directions therefrom, and cross-heads provided, respectively, with punching and bending dies having their counterparts removably secured to said bed, substantially as and for the purposes specified.

4. In a machine of the class described, the combination of a bed having a driving-shaft located midway between its extremities, said shaft being provided with crank-wheels, and an eccentric with pitmen attached thereto, respectively, and extending in opposite directions therefrom, each connecting in turn with cross-heads provided with shears, and punching-dies having suitable counterparts attached to said bed, substantially as described, and for the purposes set forth.

5. The combination, in the above-described machine, of the bed A, having a driving-shaft located midway between its extremities, said shaft being provided with crank-wheels, and an eccentric with pitmen attached thereto, respectively, the same extending in opposite directions therefrom, and connecting, respectively, with cross-heads provided with punching and bending dies, said dies having removable counterparts upon the respective ends of said bed, substantially as and for the purposes specified.

CHARLES ALKINS.

Witnesses:
  M. M. GRIDLEY,
  D. H. FLETCHER.